(12) United States Patent
Kamiyama et al.

(10) Patent No.: US 7,341,280 B2
(45) Date of Patent: Mar. 11, 2008

(54) REHABILITATING PIPE AND METHOD FOR LAYING A REHABILITATING PIPE

(75) Inventors: Takao Kamiyama, Hiratsuka (JP); Koji Kaneta, Hiratsuka (JP); Kenji Fujii, Hiratsuka (JP); Takeshi Hasegawa, Hiratsuka (JP); Makoto Ishida, Hiratsuka (JP)

(73) Assignee: Shonan Gosei-Jushi Seisakusho K.K. (JP)

( * ) Notice: Subject to any disclaimer, the term of this patent is extended or adjusted under 35 U.S.C. 154(b) by 325 days.

(21) Appl. No.: 11/031,256

(22) Filed: Jan. 7, 2005

(65) Prior Publication Data
US 2005/0225088 A1 Oct. 13, 2005

(30) Foreign Application Priority Data
Apr. 7, 2004 (JP) .............................. 2004-112638

(51) Int. Cl.
*F16L 55/18* (2006.01)

(52) U.S. Cl. .......................... 285/15; 285/412; 138/97; 138/98

(58) Field of Classification Search .................. 285/15, 285/16, 17, 412; 138/159, 161, 162, 166, 138/157, 97, 98
See application file for complete search history.

(56) References Cited

U.S. PATENT DOCUMENTS

| | | | | | |
|---|---|---|---|---|---|
| 77,285 | A | * | 4/1868 | Holske | 138/161 |
| 427,658 | A | * | 5/1890 | Bayles | 138/159 |
| 444,339 | A | * | 1/1891 | Dwelle | 138/161 |
| 558,436 | A | * | 4/1896 | Thomas | 138/173 |
| 780,152 | A | * | 1/1905 | Boyd | 138/159 |
| 875,304 | A | * | 12/1907 | Wilkening | 138/159 |
| 1,003,759 | A | * | 9/1911 | Lauritzen | 138/162 |
| 1,053,134 | A | * | 2/1913 | Zieg | 138/159 |
| 2,002,987 | A | * | 5/1935 | Schulz | 138/159 |
| 2,005,699 | A | * | 6/1935 | Gottwald | 138/108 |
| 2,215,318 | A | * | 9/1940 | Bristol | 138/162 |
| 4,545,701 | A | * | 10/1985 | Tsuzuki | 138/159 |
| 4,840,194 | A | * | 6/1989 | Berry | 138/155 |

* cited by examiner

*Primary Examiner*—David Bochna
(74) *Attorney, Agent, or Firm*—Adams & Wilks

(57) ABSTRACT

A rehabilitating pipe is assembled inside an existing pipe using segments to repair the existing pipe. A coupling member is inserted through a segment when it is coupled in the longitudinal direction to another segment coupled already, and the coupling member is joined to the coupling member of another segment already coupled. During joining the segment is clamped against another segment and both the segments are coupled in the longitudinal direction. Such steps are repeated to couple other segments to segments already coupled until the rehabilitating pipe is laid to a predetermined length.

19 Claims, 14 Drawing Sheets

REHABILITATING PIPE AND METHOD FOR LAYING A REHABILITATING PIPE

BACKGROUND OF THE INVENTION

1. Field of the Invention

The present invention relates to a rehabilitating pipe laid inside an existing pipe, such as a sewer pipe, for the purpose of rehabilitating the existing pipe, and a method of laying such a rehabilitating pipe.

2. Description of the Prior Art

A method of rehabilitating an existing pipe is known from Japanese Patent Application Publication No. 2003-214098, wherein a compound pipe is constructed to rehabilitate an existing pipe like a sewer pipe by, as shown in FIG. 16, assembling and laying inside an existing pipe 4 a rehabilitating pipe 3 whose outer diameter is slightly less than the inner diameter of the existing pipe 4, and then filling and hardening a filler (not shown) in the gap between the outer periphery of the rehabilitating pipe 3 and the inside wall surface of the existing pipe 4. The rehabilitating pipe 3 comprises segments 1 for the rehabilitating pipe. Namely, as shown in FIG. 17, a rehabilitating pipe 3 is assembled inside a manhole 5 in communication with the existing pipe 4 by an assembly worker S assembling a short, ring-shaped pipe unit 2 by coupling the arcuate segments 1 in the circumferential direction of the arcs thereof (the circumferential direction of the rehabilitating pipe 3), wherein bolts 9 for coupling in the longitudinal direction have previously been affixed, and then mutually coupling pipe units 2 inside the existing pipe 4 in the longitudinal direction of the pipe units 2 (the longitudinal direction of the rehabilitating pipe 3) by bolts 9 and nuts (not shown).

In the invention structure, the overall length of each bolt 9 is slightly less than two times the width of each segment 1 in the longitudinal direction; the bolt 9 is inserted through a bolt through hole (not shown), from one side of the segment 1 along the longitudinal direction; and the segments 1 are fixed by nuts so that the tip parts of the bolts 9 protrude from the other side of the segments 1 for a length slightly less than the width of the segment 1 in the longitudinal direction. Furthermore, the pipe units 2 are mutually coupled by passing the bolts 9 that protrude from the segments 1 of one pipe unit 2 through the bolt through holes of the segments 1 of another pipe unit 2, pushing the aforementioned another pipe unit 2 into the aforementioned one pipe unit 2, and tightening the passed through bolts 9 with nuts.

Nevertheless, there is a problem of considerable danger in the structure of coupling the segments 1 of the pipe units 2 in the longitudinal direction in the conventional rehabilitating pipe 3, i.e., because the bolts 9 fixed to each of the segments 1 assembled in the pipe units 2 protrude from one side of the segments 1 for a length (e.g., slightly less than 20 cm) slightly less than the width thereof in the longitudinal direction, there is a risk that the protruding parts of the bolts 9 may strike an assembly worker's face and the like particularly when the assembly worker rolls, carries, and couples the pipe units 2 inside the dark existing pipe 4.

In addition, there is a problem in the conventional structure in that the work of coupling is laborious and time consuming because it is necessary to screw and tighten the nuts in order to fasten the bolts 9 to the segments 1 beforehand, and further to screw and tighten the nuts to the bolts 9 also when coupling the pipe units 2 in the longitudinal direction.

In addition, the bolts 9 are buried in the filler and serve a role the same as the rebars in steel reinforced concrete when filling and hardening the filler in the gap between the outer periphery of the rehabilitating pipe 3 and the inside wall surface of the existing pipe 4 after laying the rehabilitating pipe 3; however, there is a problem in that, when calculating the strength of the compound pipe comprising the rehabilitating pipe 3 and the filler, the strength cannot be evaluated because the bolts 9 are not mutually coupled as one unit.

It is therefore an object of the present invention to solve the aforementioned problems, by providing a rehabilitating pipe wherein the work of assembling the rehabilitating pipe, particularly the work of coupling the segments in the longitudinal direction, can be performed safely, simply, and in a short time period, and wherein the strength of the coupling members in the longitudinal direction can be evaluated when calculating the strength of the compound pipe; and also to provide a method of laying such a rehabilitating pie.

SUMMARY OF THE INVENTION

A rehabilitating pipe for rehabilitating an existing pipe according to the present invention comprises segments that are mutually coupled in circumferential and longitudinal directions of the existing pipe to assemble the rehabilitating pipe, and a coupling member provided for each segment for coupling the segments in the longitudinal direction. When an additional segment is coupled in the longitudinal direction to the already coupled segment, a coupling member is inserted through the additional segment and joined to the coupling member of the already coupled segment. When both the coupling members are joined, the coupling member inserted through the additional segment clamps it against the already coupled segment to thereby couple both the segments in the longitudinal direction.

According to a method of laying a rehabilitating pipe inside an existing pipe according to the present invention, segments are used and coupled in the circumferential and longitudinal directions of the existing pipe. A coupling member is inserted through a segment when it is coupled in the longitudinal direction to another segment coupled already, and the coupling member is joined to the coupling member of another segment already coupled. During joining the segment is clamped against another segment and both the segments are coupled in the longitudinal direction. Such steps are repeated to couple other segments to segments already coupled until the rehabilitating pipe is laid to a predetermined length.

According to the present invention, the coupling member for each segment can be made to protrude by only a small dimension from the segment, the work of assembling the rehabilitating pipe inside the existing pipe, particularly the work of coupling the segments in the longitudinal direction, can be performed far more safely than conventionally.

In addition, because coupling the segments in the longitudinal direction can be performed by just joining the coupling members inserted through the segments, and there is therefore no need to fix the coupling member to the segment beforehand by nuts and the like, the work of coupling the segments in the longitudinal direction can be performed far more simply and in a shorter time period than conventionally.

In addition, the continuous coupling members extend across the overall length of the rehabilitating pipe because a plurality of coupling members are successively coupled as one unit, thus obtaining the excellent effect of increasing the strength of the compound pipe comprising the rehabilitating pipe and the filler.

Further features of the invention, its nature and various advantages will be more apparent from the accompanying drawings and following detailed description of the invention.

DESCRIPTION OF THE PREFERRED EMBODIMENTS

Figure 1:
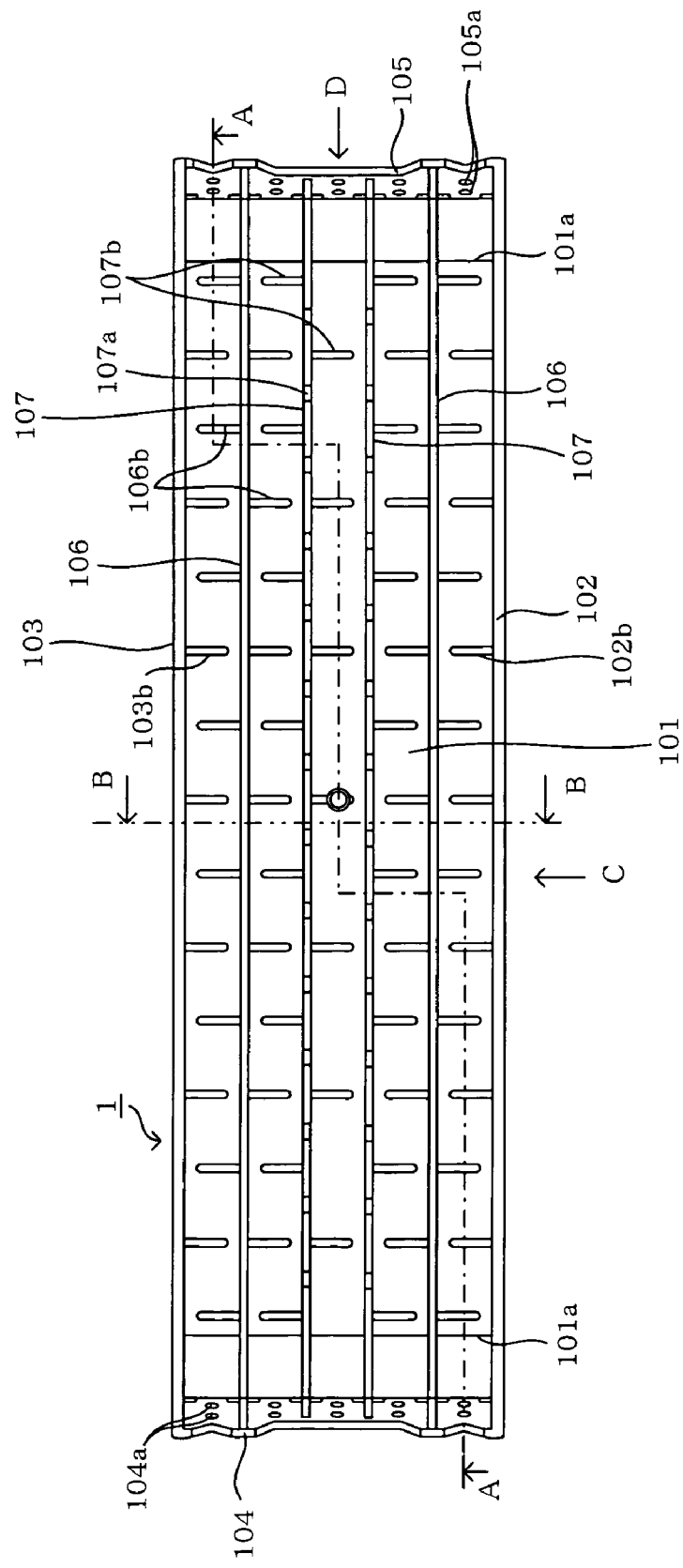
FIG. 1 is a top view that depicts the structure of the segment for the rehabilitating pipe constituting the rehabilitating pipe of the first embodiment according to the present invention.

The present invention will be described based on preferred embodiments, referring to the drawings.

Although the embodiment explained herein is of a rehabilitating pipe having a ring-shaped configuration in the form of a circular pipe, it is understood that the present invention can also be applied to a rehabilitating pipe whose cross-sectional shape orthogonal to the longitudinal direction is a ring shape other than a circle, such as a rectangle; furthermore, it is also understood that the present invention can also be applied to a case wherein the aforementioned cross-sectional shape is not open, but rather is closed on one side, e.g. horseshoe-shaped, semi-circular, or U-shaped.

Figure 9:
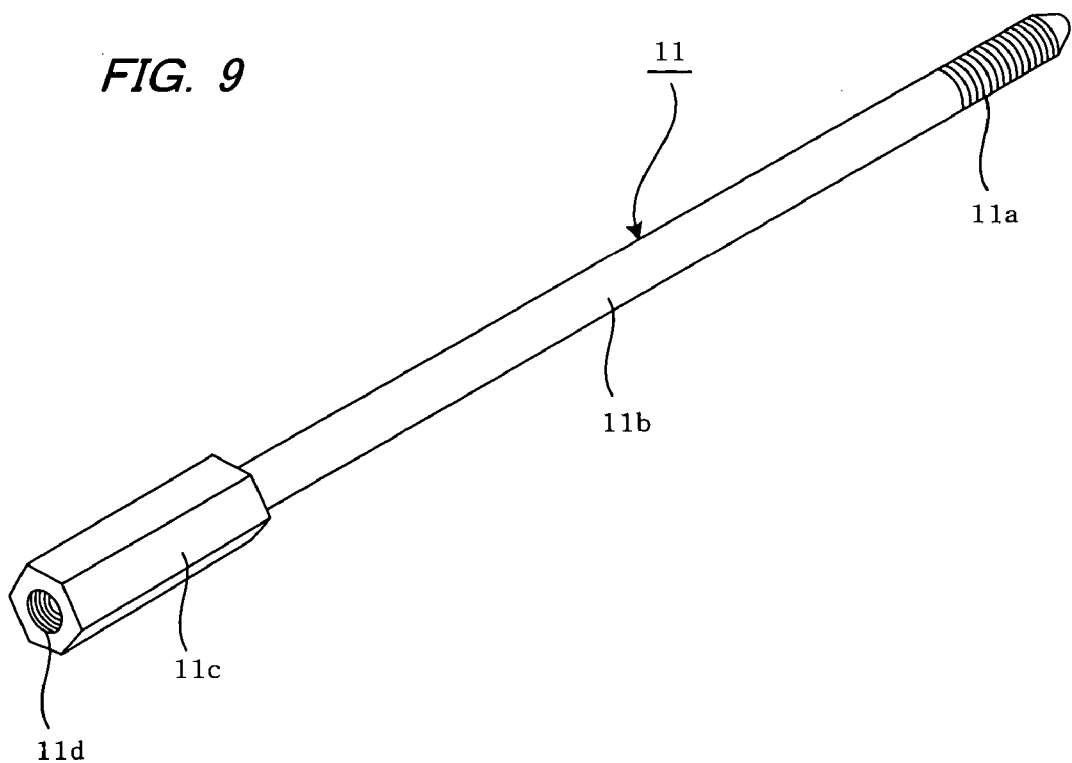
FIG. 9 is a perspective view that depicts the structure of a coupling member for mutually coupling pipe units (mutually coupling segments) in the longitudinal direction.
Figure 16:
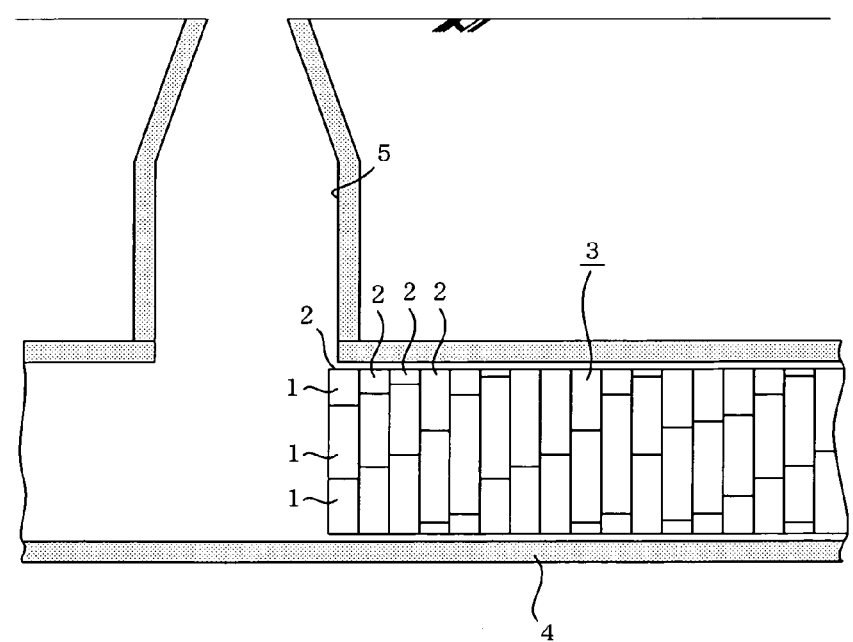
FIG. 16 is a cross-sectional view that depicts an aspect wherein the entire length of the rehabilitating pipe is assembled.

The rehabilitating pipe of the first embodiment according to the present invention is a rehabilitating pipe 3, as shown in FIG. 16, assembled and laid inside an existing pipe 4, such as a sewer pipe, the same as in the previously discussed conventional example. The rehabilitating pipe is assembled and laid by coupling a plurality of arcuate segments 1 (hereinbelow, designated as segment members) in the circumferential and longitudinal directions along the existing pipe 4. However, the coupling structure in that longitudinal direction differs as shown in FIG. 9 from the conventional one, as discussed later.

Figure 2:
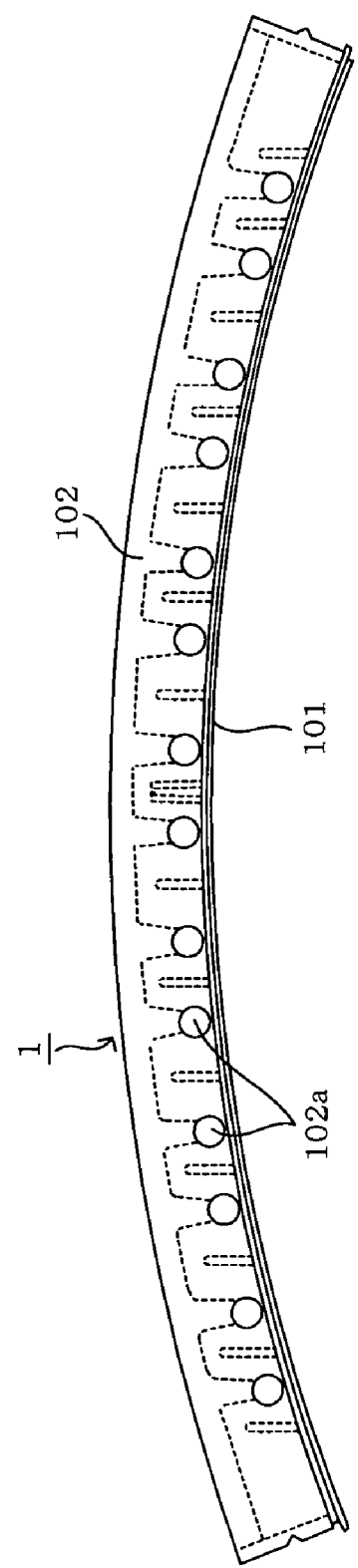
FIG. 2 is a side view shown from the arrow C direction in FIG. 1.
Figure 3:
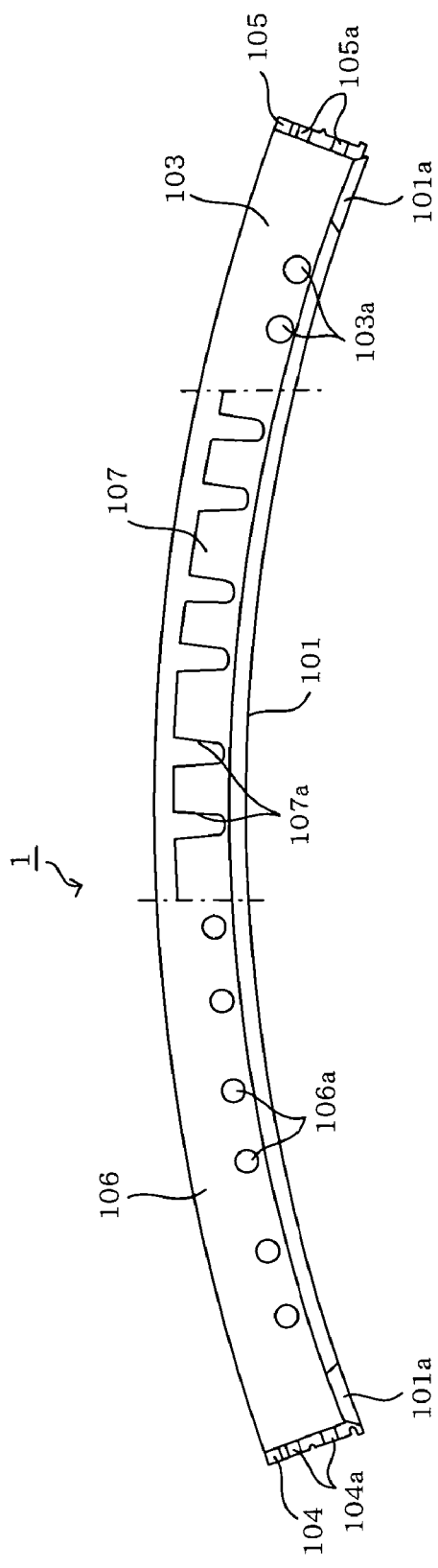
FIG. 3 is a cross-sectional view taken along the A-A line in FIG. 1.
Figure 4:
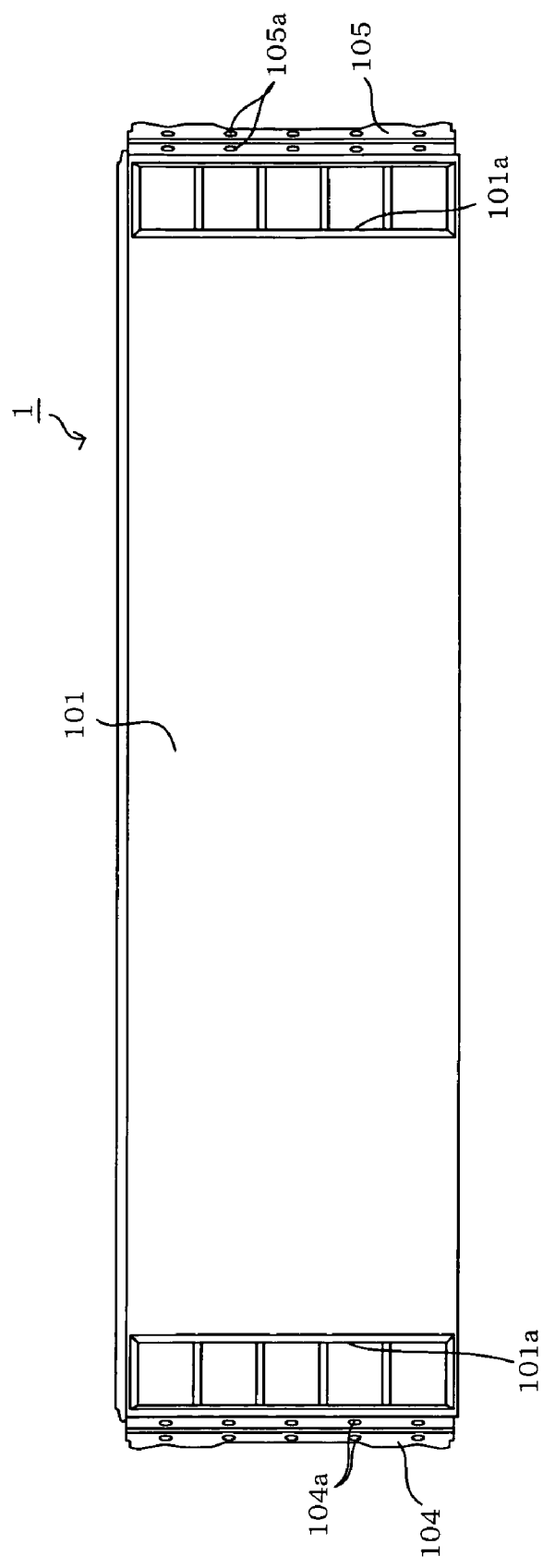
FIG. 4 is a bottom view of the segment.
Figure 5:
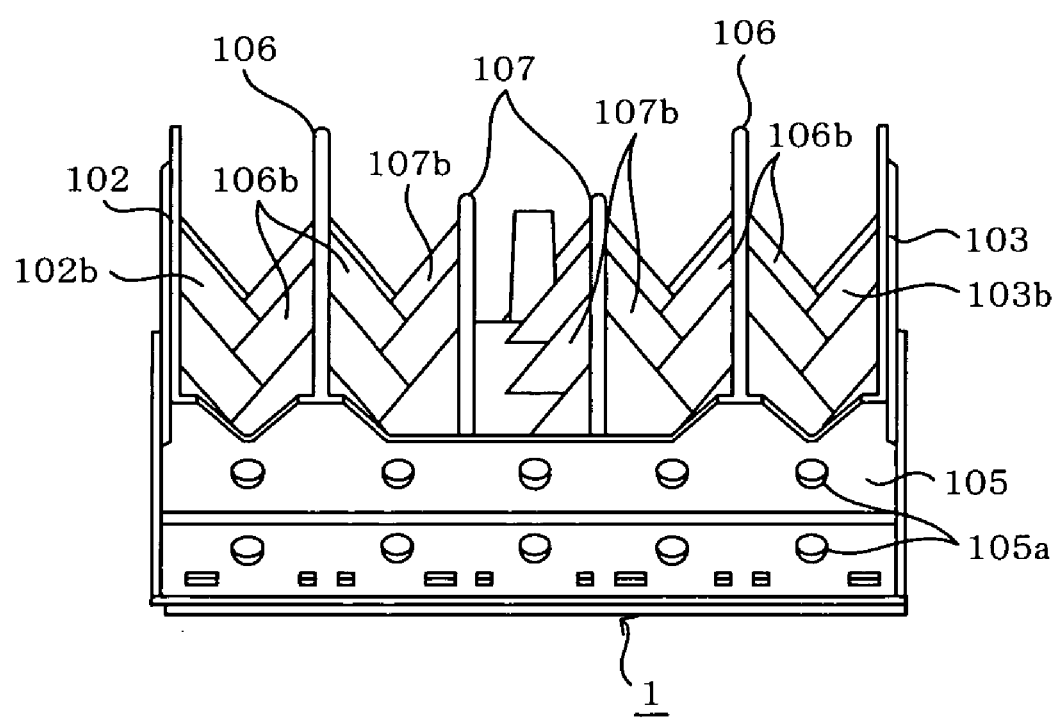
FIG. 5 is an auxiliary view in the arrow D direction of FIG. 1.
Figure 6:
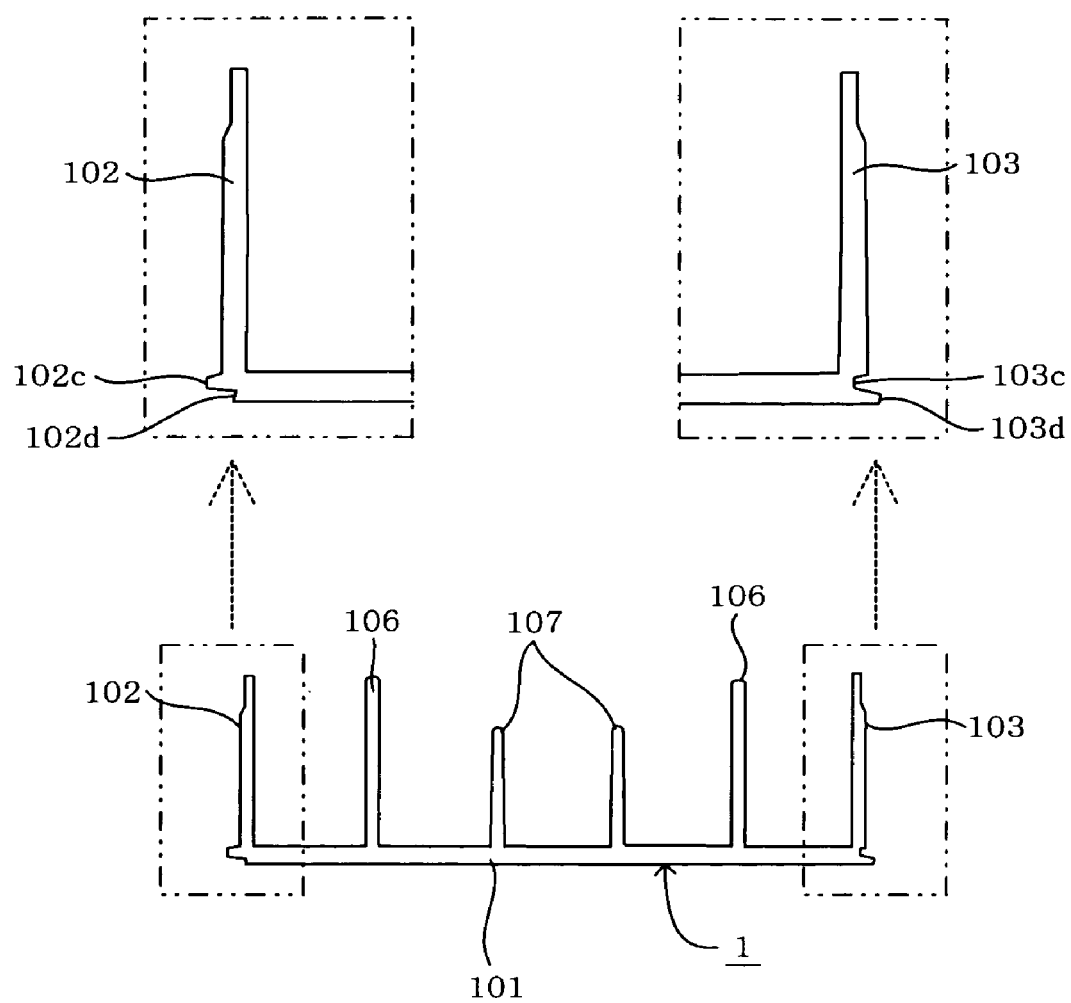
FIG. 6 is a cross-sectional view taken along the B-B line in FIG. 1, and a partial enlarged view thereof.

The structure of the segment member 1 will first be explained based on FIG. 1 through FIG. 6. FIG. 1 is a top view of the entire segment member 1. FIG. 2 is a side view viewed in the arrow C direction in FIG. 1. FIG. 3 is a cross-sectional view taken along the A-A line in FIG. 1. FIG. 4 is a bottom view of the segment member 1. FIG. 5 is an auxiliary view viewed in the arrow D direction in FIG. 1. FIG. 6 is a cross-sectional view taken along the upper B-B line in FIG. 1, and a partial enlarged view thereof.

The segment member 1 comprises an inner plate 101, side plates 102 and 103, end plates 104 and 105, and respectively two each of reinforcing plates 106 and 107. The segment member 1 is integrally formed from transparent, semitransparent, or opaque plastic. Vinyl chloride, ABS, DuraStar polymer (trade name), and the like are used as the transparent plastic. PVC, polyethylene, and the like are used as the semi-transparent plastic. PVC, polyester, ABS, polyethylene, polypropylene, and the like are used as the opaque plastic.

The inner plate 101 is formed as a plate having a prescribed width and is arcuately curved at a prescribed angle that divides the circumference into a plurality of equal parts, e.g., 72° to divide into five parts, and the bottom thereof (arcuate inside surface) forms the inner circumferential surface of the pipe unit 2, and forms the inner circumferential surface of the rehabilitating pipe 3. In addition, the circumferential direction of the arc of the inner plate 101 is the circumferential direction of the rehabilitating pipe (hereinbelow, referred to simply as the circumferential direction unless notification is otherwise required), and the width direction of the inner plate 101 is in the longitudinal direction of the rehabilitating pipe (hereinbelow, referred to simply as the longitudinal direction unless notification is otherwise required). A rectangular opening 101a is formed respectively on each of both end parts of the inner plate 101 in the circumferential direction. These openings 101a are for the purpose of performing from the inside the work of tightening bolts 6 (refer to FIG. 8) for mutually coupling the segment members 1 in the circumferential direction; after that tightening work, a cover (not shown) is fixed to the inner plate 101 to plug each opening 101a.

The side plates 102 and 103 are formed respectively along the entire length of both side edges of the inner plate 101 along the circumferential direction, and are provided upright outwardly on the outer surface of the inner plate 101. In each of the side plates 102 and 103 are formed a plurality (herein, 14) of through holes 102a and 103a at a prescribed interval in the circumferential direction for passing therethrough in the longitudinal direction the coupling members 11 as shown in FIG. 9 for coupling the segments in the longitudinal direction. The diameter of the through holes 102a and 103b is slightly greater than the diameter of a nut part 11c of the coupling member 11.

The outside surface of each of the side plates 102 and 103 form the coupling surfaces in the longitudinal direction that the segment members 1 mutually contact when mutually coupling the segment members 1 in the longitudinal direction. As shown in FIG. 6, a protruding part 102c and a recessed part (groove) 102d are formed vertically continuous at the lower end part of the outside surface of the side plate 102, and a recessed part 103c and a protruding part 103d are formed vertically continuous at the lower end part of the outside surface of the side plate 103. These are formed along the entire length of the side plates 102 and 103 along the side edge of the inner plate 101 in the circumferential direction. The protruding part 102c and the recessed part 103c are shaped to mutually conform, i.e., having shapes capable of mutually coupling with tight (without any gap) surface contact, and the recessed part 102d and the protruding part 103d are also shaped to mutually conform.

The end plates 104 and 105 are formed at both ends of the inner plate 101 along the entire length of the width direction of the inner plate, and are provided upright outwardly on the outside of the arc of the inner plate 101. A plurality of through holes 104a and 105a for inserting therethrough the bolts 6 (refer to FIG. 8) that mutually couple the segment members 1 in the circumferential direction are formed in the end plates 104 and 105.

In addition, the outside surfaces of the end plates 104 and 105 form the coupling surfaces in the circumferential direction that the segment members 1 mutually contact when mutually coupling the segment members 1 in the circumferential direction. As shown in the cross-sectional view of FIG. 7, a recessed part (groove) 104c is formed at the center part of the vertical direction of the outside surface of the end plate 104, and a recessed part (groove) 104d and a protruding part 104e are formed vertically continuous at the lower end part thereof. In addition, a protruding part 105c is formed at the center part in the vertical direction of the outside surface of the end plate 105, and a protruding part 105d and a recessed part 105e are formed vertically continuous at the lower end part thereof. These are formed along the entire length of the end plates 104 and 105 in the width direction.

The recessed parts 104c and 104d and the protruding part 104e of the end plate 104 are respectively shaped to mutually conform to the protruding parts 105c and 105d and the recessed part 105e of the end plate 105.

The reinforcing plates 106 and 107 reinforce the mechanical strength of the entire segment member 1, and are provided upright on top of the inner plate 101 (the outside surface of the arc) and on the inside of the side plates 102 and 103. A plurality of through holes 106a and notched parts 107a for inserting therethrough in the longitudinal direction the coupling members 11 (refer to FIG. 9) for coupling the pipe units are formed in the reinforcing plates 106 and 107 at a position respectively corresponding to the through holes 102a and 103a of the side plates 102 and 103. The diameter of each through hole 106a is slightly greater than the diameter of a shaft part 11b of the coupling member 11, but slightly less than the diameter of the nut part 11c.

In addition, at a plurality of locations on the inside surfaces of the side plates 102 and 103 and both side surfaces of the reinforcing plates 106 and 107 (only one side surface of one of the reinforcing plates 107) are formed a plurality of small right triangular protruding plates 102b, 103b, 106b and 107b that project sideways to prevent deformation thereof, and the bases thereof are formed so that they are continuous with the inner plate 101 (refer to FIG. 5).

The structure of elements for coupling the segment members in the longitudinal direction will be described based on FIG. 9, FIG. 10, and FIG. 11.

Figure 13:
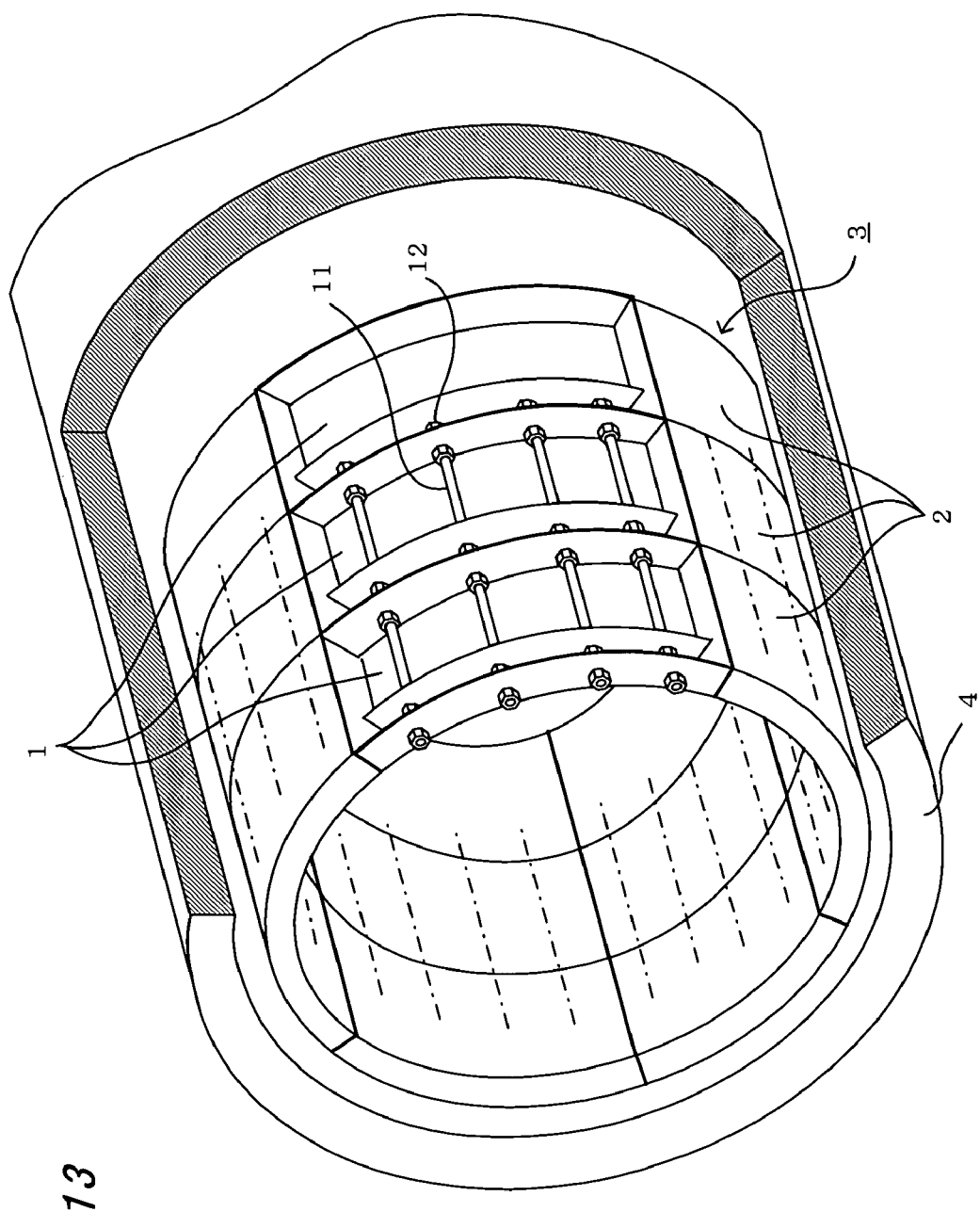
FIG. 13 is a partial broken perspective view that depicts the state wherein the rehabilitating pipe is assembled by coupling a plurality of pipe units inside the existing pipe in the longitudinal direction with coupling members.

The coupling member 11 shown in FIG. 9 comprises an integrally formed metal rod having a shaft part 11b with a screw part 11a at one end serving as a coupling end and a nut part 11c at the other end serving as a target coupling end (a coupling end to be coupled). A screw hole 11d is formed in the nut part 11c that can screw onto a screw the same as the screw part 11a. By mutually joining a plurality of coupling members 11 by screwing in one screw part 11a into the screw hole 11d of another nut part 11c, coupling members 11 can be integrally and mutually coupled as shown in FIG. 13.

Furthermore, the overall length of the coupling member 11 is a dimension that is the sum of the width dimension of the segment member 1 in the longitudinal direction (dimension from the outside surface of the side plate 102 to the outside surface of the side plate 103) plus a prescribed screw-in dimension (e.g., slightly less than approximately 10-20 mm) needed to join, with sufficient strength, the screw part 11a and the nut part 11c of mutual coupling members 11 by the abovementioned screwing-in. In addition, the length of the nut part 11c is preferably a dimension that is the sum of a dimension greater than the dimension from the outside surface of the side plate 102 (or 103) to the outside surface of the adjacent reinforcing plate 106 plus the abovementioned prescribed screw-in dimension. In addition, it is understood that the depth dimension of the screw hole 11d is the abovementioned prescribed screw-in dimension, or a dimension greater than such.

In addition, the shaft part 11b and the nut part 11c may also be joined by separating the shaft part 11b and the nut part 11c, forming a thread part also on the end part of the nut part 11c side of the shaft part 11b, making the screw hole 11d pass through the entire length of the nut part 11c, and screwing in the abovementioned thread part of the shaft part 11b into the screw hole 11d of the nut part 11c from the opposite side.

Figure 10:
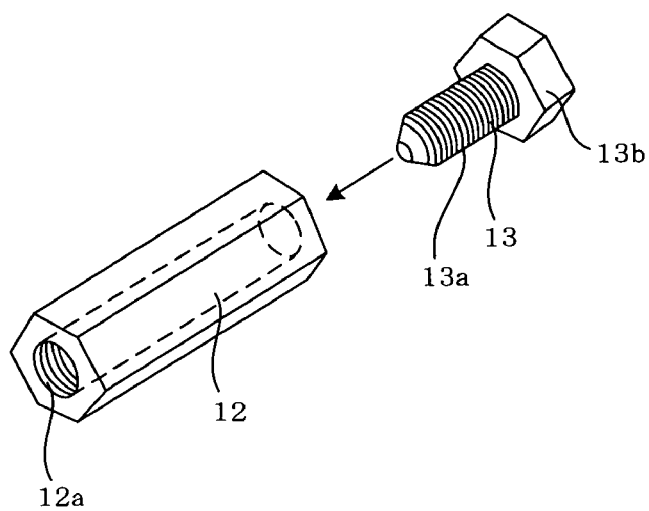
FIG. 10 is a perspective view of the fixing nut and bolt for fixing the first coupling member in the coupling order.

The fixing nut 12 shown in FIG. 10 is also made of metal, its length and diameter are the same as those of the nut part 11c of the coupling member 11, and is formed so that a screw hole 12a having a diameter the same as the screw hole 11d passes through its overall length.

A bolt 13 is a short bolt for fixing the fixing nut 12 to the segment member 1 of the first pipe unit 2; the diameter of a head part 13b is the same as that of the fixing nut 12; the diameter of a screw part 13a corresponds to that of the screw hole 12a of the fixing nut 12; and, the screw part 13a is screwed into the screw hole 12a.

Figure 11:
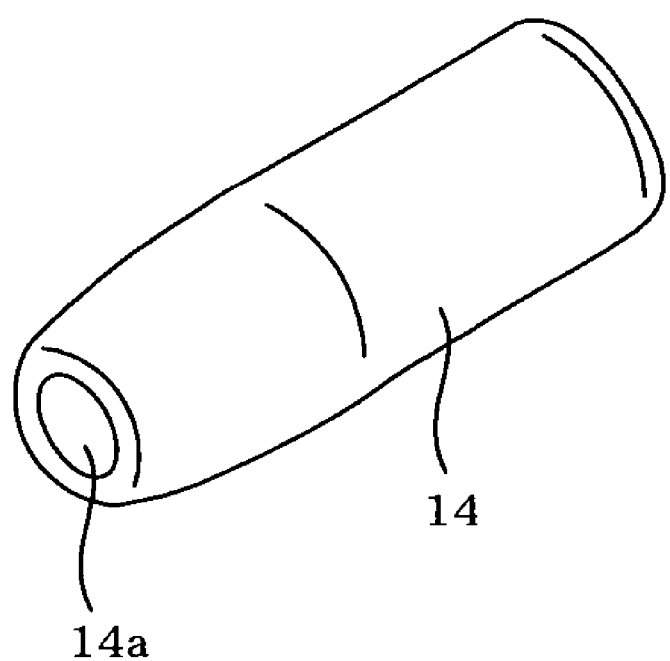
FIG. 11 is a perspective view of the positioning member for mutually positioning the through holes of the pipe units to be coupled.

When mutually coupling the pipe units 2 in side-by-side relationship in the longitudinal direction, the positioning member 14 shown in FIG. 11 performs positioning so that, for mutual segment members 1 of coupled pipe units 2, the position of the through hole 102a of one of the side plates 102 matches a through hole 103a of the other side plate 103. The positioning member 14 is cylindrically formed, with a hole 14a passing therethrough in the axial direction; a tip part is slightly tapered, and is formed as a somewhat rounded truncated cone. The diameter of the bulk outside the tip part is substantially equal to the through holes 102a and 103a of the side plates 102 and 103. In addition, it is slightly longer than the nut part 11c of the coupling member 11. Furthermore, the hole 14a does not necessarily need to be formed.

The following explains the details of a method for assembling and laying, from segment members 1, a rehabilitating pipe 3 inside an existing pipe 4.

Figure 7:
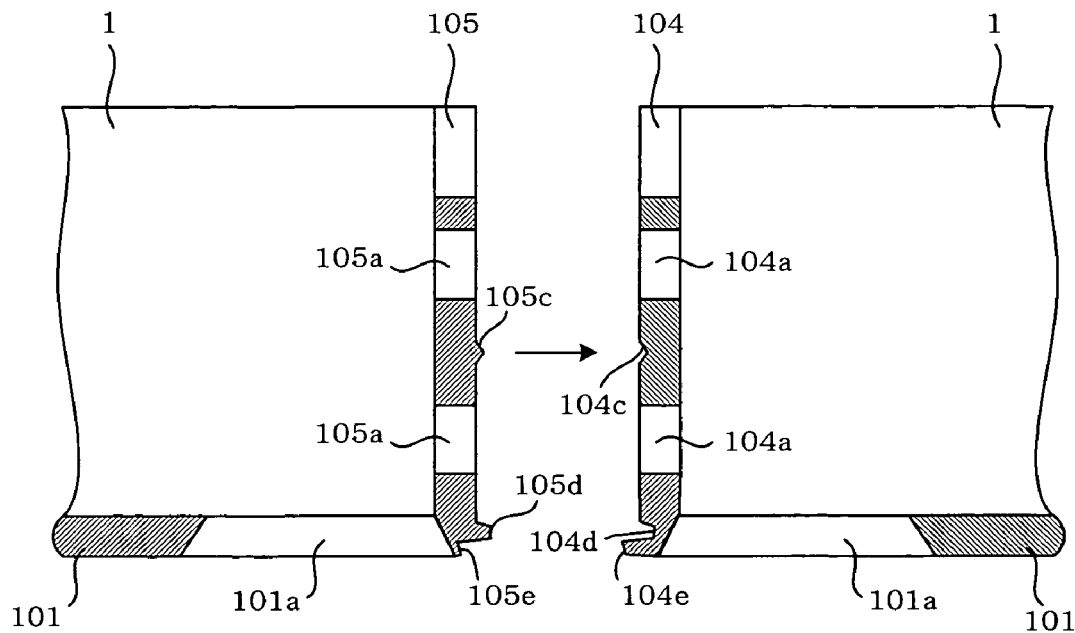
FIG. 7 is a longitudinal side view that explains the method of mutually coupling the segments in the circumferential direction.
Figure 8:
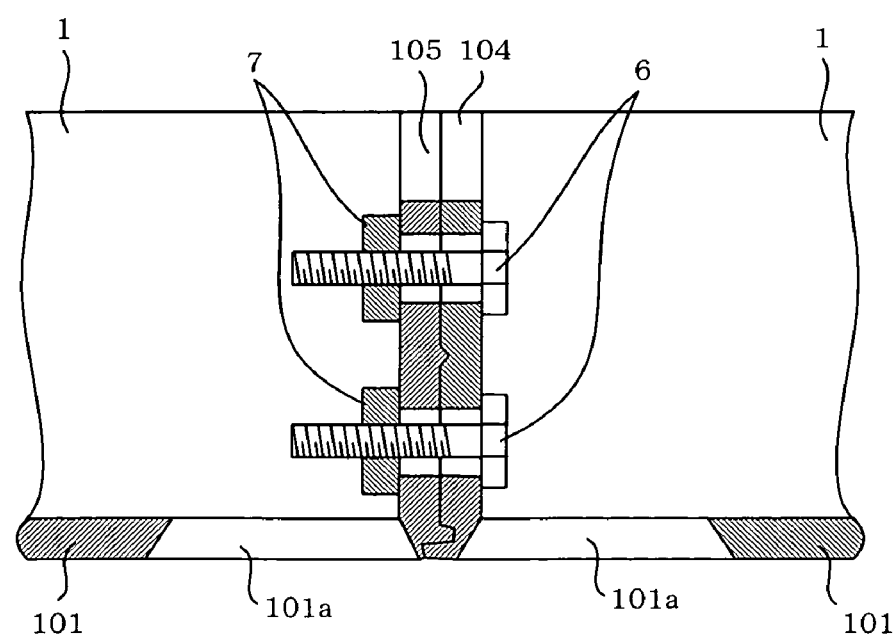
FIG. 8 is a longitudinal side view that depicts the state wherein the segments are mutually coupled in the circumferential direction.
Figure 15:
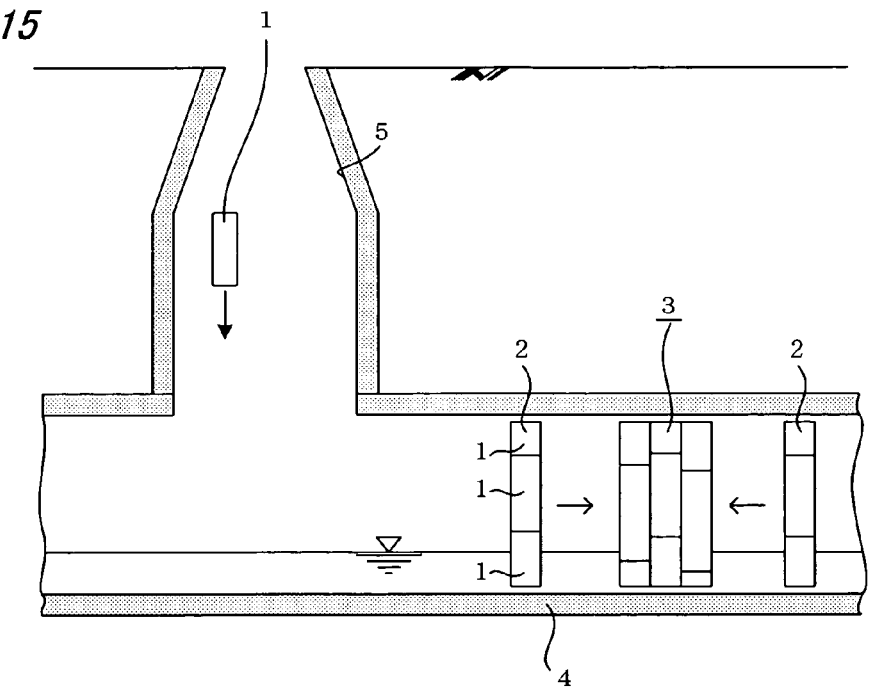
FIG. 15 is a cross-sectional view that depicts an aspect wherein the rehabilitating pipe for rehabilitating the existing pipe is assembled by carrying segment members into the existing pipe and coupling the pipe units.

First, as shown in FIG. 15, the segment members 1 are carried inside a manhole 5 that communicates with the existing pipe 4, and a plurality of these are coupled in the circumferential direction to assemble short, circular, ring-shaped pipe units 2. The coupling thereof is performed as shown in FIG. 7 through FIG. 8. Namely, the protruding parts 105c and 105d and the recessed part 105e of the end plate 105 of the segment member 1 on the left side in FIG. 7 are first respectively interfitted with the recessed parts 104c and 104d and the protruding part 104e of the end plate 104 of the segment member 1 on the right side, to mutually tightly seal the outside surfaces of the end plates 104 and 105. Furthermore, a sealing material (not shown) is coated beforehand on the inside surface of the recessed parts 104c, 104d and 105e.

Next, the segment members 1 are mutually coupled in the circumferential direction by introducing the bolts 6 shown in FIG. 8 via the opening 101a of the inner plate 101 of the right side segment member 1, and inserting them through the bolt through holes 104a and 105a of the end plates 104 and 105; introducing nuts 7 via the opening 101a of the segment member 1 on the left side, screwing them to the bolts 6, and tightening them to the end plate 105.

Thus, after the segment members 1 are successively coupled in the circumferential direction and assembled as a pipe unit 2 in this manner, the pipe units 2 are coupled in side-by-side relationship in the longitudinal direction, as shown in FIG. 15, to assemble a rehabilitating pipe 3. Herein, a method of successively coupling only one side (e.g., the left side in FIG. 15 of the pipe units 2 in the longitudinal direction (hereinbelow, referred to as one-sided coupling), or a method of successively coupling both sides (the left side and the right side) of the pipe units 2 in the longitudinal direction (hereinbelow, referred to as both sided coupling) can be employed. These coupling methods will be explained based on FIG. 12.

In single sided coupling, the fixing nut 12 is first fixed only to one side, e.g., the side plate 103 of a segment member 1A of the first pipe unit 2 (starting pipe unit). In this case, the fixing nut 12 is inserted from the outside of the through hole 103a of the side plate 103, and the bolt 13 is inserted from the opposite side of the through hole 106a of the adjacent reinforcing plate 106 and is screwed to the nut 12 until both clamp the reinforcing plate 106. This fastens the fixing nut 12 to the segment member 1A. If the number of fixing nuts 12 to be fixed per segment member 1A is, for example, four, then a fixing nut 12 is fixed every third through hole 103a.

Next, the side plate 102 of a segment member 1B of the second pipe unit 2 is pressed against and tightly contacted to the side plate 103 of the segment member 1A; however, beforehand, at each of four locations corresponding to fixing nuts 12 in the segment member 1A, an initial coupling member 11A is inserted therethrough, and the positioning member 14 is also fitted adjacent thereto. The coupling member 11A is inserted along the longitudinal direction from the side plate 103, with the screw part 11a first, through the through hole 103a, the through hole 106a, the notched parts 107a, and the through hole 102a, and is inserted through until the nut part 11c hits against the reinforcing plate 106 adjacent to the side plate 103. The positioning member 14 is inserted rearward into the through hole 102a of the side plate 102 adjacent to the coupling member 11A, and is positioned at a position where it contacts with the reinforcing plate 106 adjacent to the side plate 102.

When both the segment members 1A and 1B are coupled together, the positioning member 14 is inserted into the through hole 103a of the segment member 1A, and the tip part of the fixing nut 12 protruding from the segment member 1A is fitted in the through hole 102a of the segment member 1B. The coupling member 11A is then rotated so that the screw part 11a is screwed into the screw hole 12a of the nut 12 until the nut 11c of the coupling member 11A abuts the reinforcing plate 106. The additional screwing causes the coupling member 11A to be joined firmly to the fixing nut 12 to clamp the segment member 1B against the segment member 1A, thereby reliably coupling both the segment members 1A and 1B in the longitudinal direction.

Figure 12:
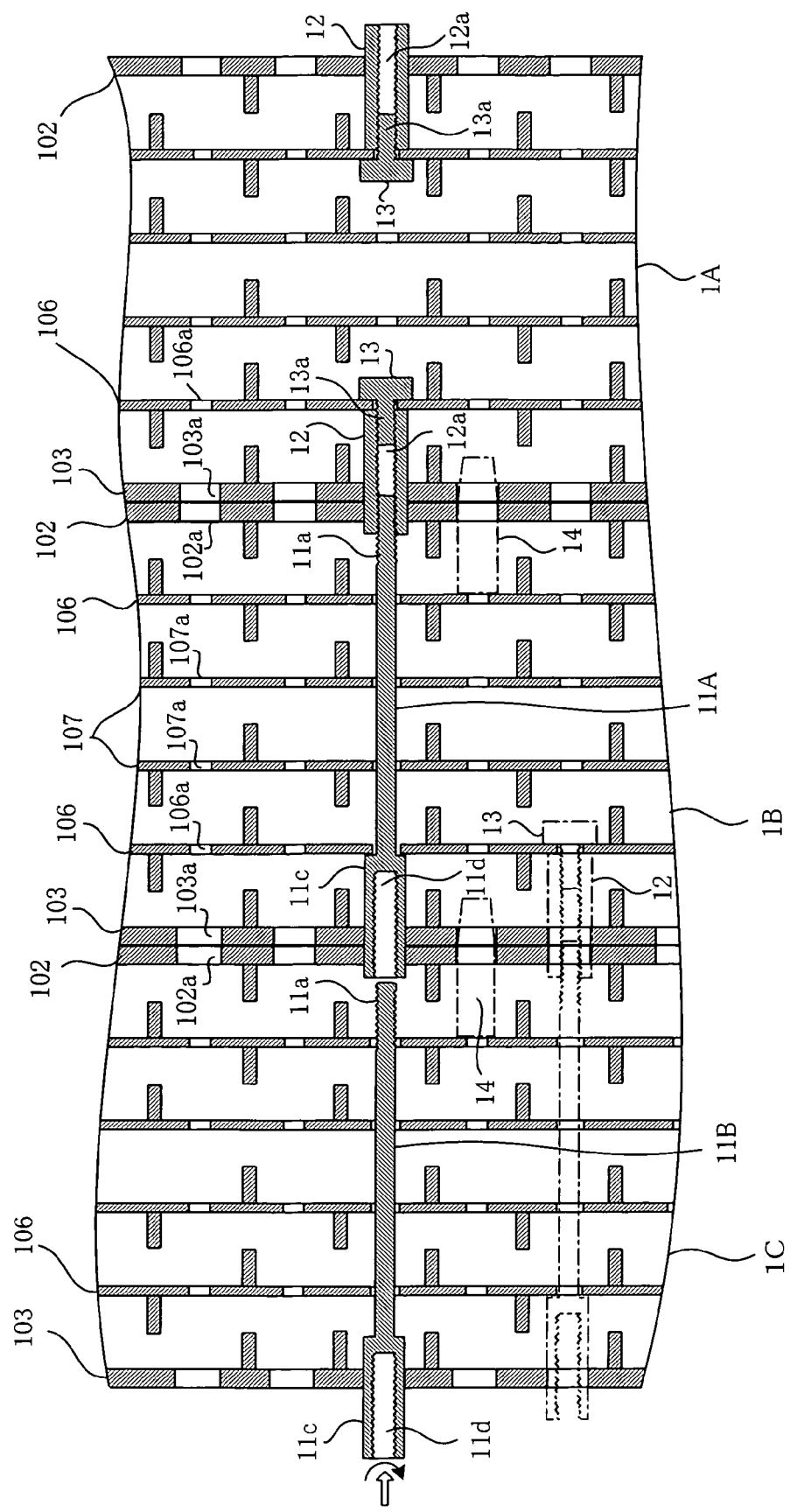
FIG. 12 is a transverse sectional view that explains the method of mutually coupling the pipe units (mutually coupling the segments) in the longitudinal direction by the coupling members.

Furthermore, although not shown in FIG. 12, when pressing the side plate 102 of the segment member 1B to the side plate 103 of the segment member 1A, the protruding part 102c and the recessed part 102d of the side plate 102 are fitted to the recessed part 103c and the protruding part 103d of the side plate 103 (refer to FIG. 6); the outside surfaces of the side plates 102 and 103 are mutually tightly sealed; and the recessed parts 102d and 103c are coated with a sealing material (not shown) beforehand.

Next, a second coupling member 11B is likewise inserted at each of four locations from the side plate 103 through a segment member 1C until the nut part 11c contacts with the reinforcing plate 106. A positioning member 14 is likewise fitted, and the side plate 102 of the segment member 1C, positioned by the positioning member 14, is likewise pressed against and tightly contacted to the side plate 103 of the segment member 1B. The coupling member 11B is then rotated, as shown by the arrow, for screwing into the coupling member 11A until the nut part 11c of the coupling member 11B hits against the reinforcing plate 106 of the segment member 1C. Then, the coupling member 11B is further rotated so that the segment member 1C is clamped to the segment member 1B until both the segment members 1B and 1C are mutually firmly coupled in the longitudinal directions. Subsequently, other segment members 1 can be successively coupled to the already coupled segment members until the rehabilitating pipe is assembled to a predetermined length in the longitudinal direction.

In the above explanation, the coupling members are inserted beforehand through the segment members. It is, however, acceptable to insert the coupling members through the segment members after they are brought into contact with the segments already coupled.

Furthermore, the positioning member 14 is shown by the chain line in FIG. 12 because it is not necessarily needed. In addition, as shown by the chain line in FIG. 12, it is also possible to change the position at which the coupling member 11B is inserted through. In so doing, the position of insertion of the coupling members can be shifted as needed. In addition, it is also acceptable to use both the coupling members 11B, one indicated by the solid lined and the other indicated by the chain line. This increases the mechanical strength in the rehabilitating pipe assembled.

In addition, in both sided coupling, the segment members 1B, 1C . . . are coupled via the coupling members 11A, 11B . . . successively on the left side, as discussed above, and segment members are coupled likewise via a plurality of coupling members 11 successively on the right side. In both sided coupling, the number of assembly workers is double that of one sided coupling, and coupling can be completed in half the time of one sided coupling.

In performing the steps as described above, a rehabilitating pipe 3 can be assembled and laid by mutually coupling the segment members 1 of a plurality of pipe units 2 inside an existing pipe 4, as shown in FIG. 13. Furthermore, the detailed structure of the segment member 1 is omitted in FIG. 13, the insertion position of the coupling member 11 outside of the coupling member 11 shown in the figure is indicated by a chain line, and only one reinforcing plate is shown. In addition, in FIG. 13, each end plate of each of the segment members is aligned and coupled in the longitudinal direction; however, as shown in FIG. 15 and FIG. 16, they can be coupled with the positions of the end plates shifted. Furthermore, it is understood that the number of coupling members 11 inserted per segment member 1 is not limited to four.

The work of rehabilitating the existing pipe 4 is completed by filling and hardening the filler (not shown) between the outer periphery of the rehabilitating pipe 3 assembled and laid as described above and the inside wall surface of the existing pipe 4.

Figure 17:
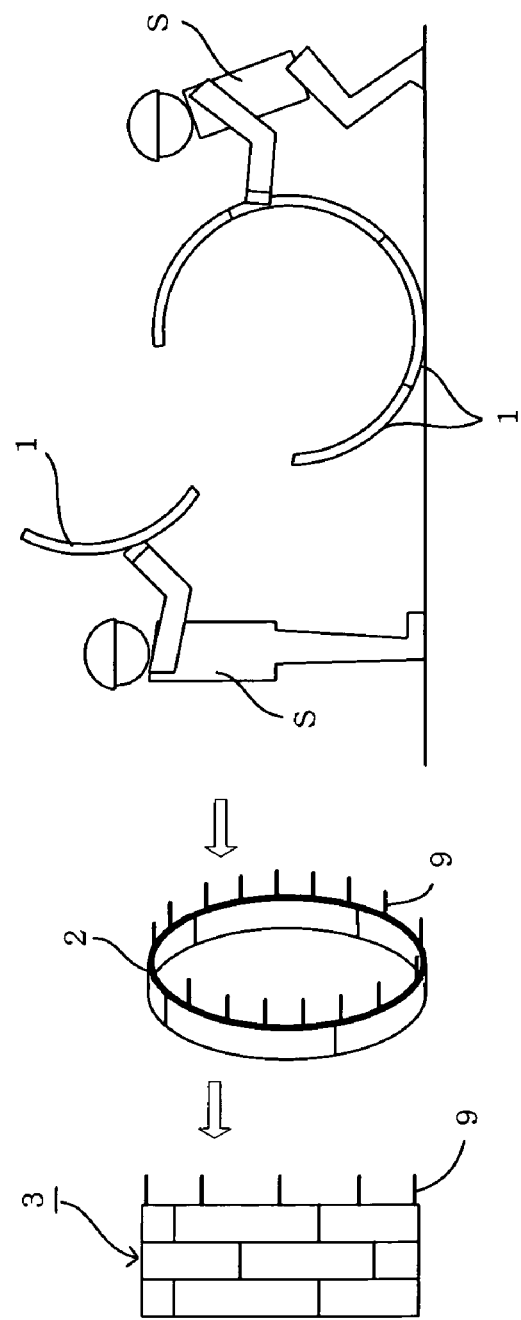
FIG. 17 is an explanatory view that explains the assembly of a conventional rehabilitating pipe.

According to the first embodiment as described above, the pipe units 2 are mutually coupled (mutually, the respective segment members 1) in the longitudinal direction by mutually coupling the coupling members 11; consequently, the overall length of the coupling member 11 (the length in the longitudinal direction) can be set to a dimension that is the sum of the width dimension of the segment member 1 in the longitudinal direction plus just the small prescribed screw-in dimension (e.g., slightly less than 10-20 mm) needed to join the screw part 11a and the nut part 11c of mutual coupling members 11. Consequently, the coupling member 11 protrudes only slightly from the segment members. There is therefore no risk that the coupling member 11 will strike the face of the worker when performing the work of assembling the rehabilitating pipe 3 inside the existing pipe 4, particularly during the work of coupling in the longitudinal direction, and the assembly work can be performed far more safely than in the conventional example explained by FIG. 17.

Furthermore, it is safe because the fixing nut 12 fixed to the segment member 1 of the first pipe unit 2 also protrudes only slightly from the side plate 102 or 103.

In addition, because coupling in the longitudinal direction can be performed just by screwing in the screw part 11a of the coupling member 11 inserted through the segment member 1 into the screw hole 11d of the coupling member 11 inserted through the segment member 1 to which it is coupled or into the screw hole 12a of the fixing nut 12, and because there is no need to fix the coupling member 11 beforehand to the segment member 1 by a nut and the like, the work of coupling in the longitudinal direction can be performed far more simply and in a shorter time period than conventionally.

In addition, because a plurality of coupling members 11 are successively coupled as one unit, the strength can be evaluated when calculating the strength of the compound pipe comprising the rehabilitating pipe 3 and the filler; and because the coupling members are formed as in a single rebar and extend across the entirety in the longitudinal direction, the strength of the rehabilitating pipe can be increased when filling and hardening the filler, such as grout, between the outer periphery of the rehabilitating pipe 3 and the inside wall surface of the existing pipe 4.

Figure 14A:
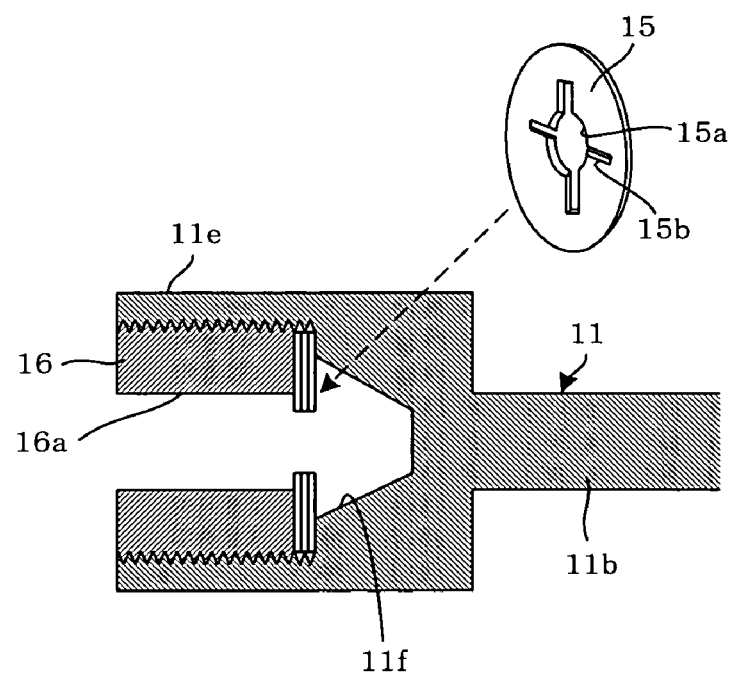
FIG. 14a is a cross-sectional view that depicts the structure of the target coupling end of the coupling member according to the second embodiment.

In the first embodiment, the target coupling end of the coupling member 11 was made the nut part 11c, but may be structured as shown in FIG. 14a. In this structure, the target coupling end is a cylindrical socket part 11e wherein a hole 11f is formed. More than half the depth portion of the hole 11f from the forefront is columnar-shaped, the depth portion beyond that is formed as a circular truncated cone having a diameter less than the columnar shape thereof, and a thread groove is cut in the inner circumferential surface of the columnar part.

A plurality of snaps 15 comprising circular elastic metal plates are arranged at the back of the columnar part of the hole 11f overlapping in the axial direction and facing orthogonal to the axial direction of the coupling member 11, which are tightened and fixed by a set screw 16 screwed into the columnar portion of the hole 11f. A circular hole 15a is formed at the center of each snap 15, and the diameter thereof is slightly less than the diameter of the screw part 11a of the coupling member 11. In addition, thin slits 15b are radially formed at positions that divide the circumference of the hole 15a into four parts. A hexagonal hole 16a having a diameter slightly greater than the screw part 11a of the coupling member 11 is formed through the set screw 16.

Figure 14B:
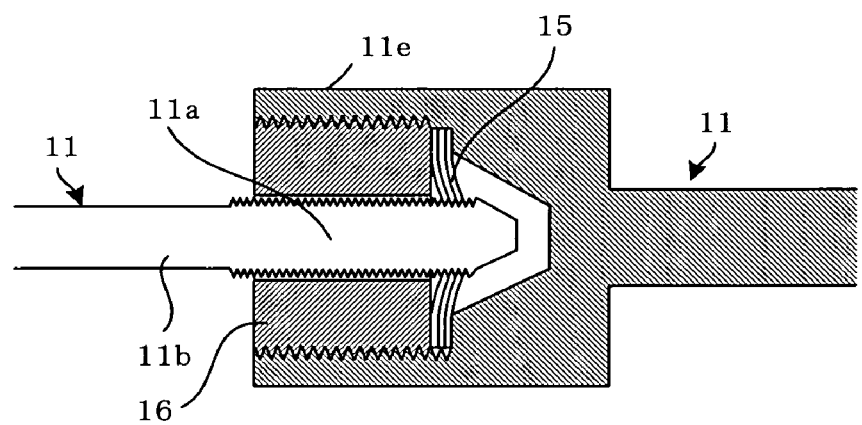
FIG. 14b is a cross-sectional view that explains the coupling operation according to the second embodiment.

In this type of structure, as shown in FIG. 14b, the screw part 11a of another coupling member 11 is inserted into the hole 16a of the set screw 16 of the socket part 11e, and can be pressed into the hole 15a by bending the part at the perimeter of the hole 15a of each of the plurality of snaps 15; in this state, the bent parts of the plurality of snaps 15 are brought into contact under pressure and engaged with the screw part 11a, thereby joining the screw part 11a to the socket part 11e and mutually coupling the coupling members 11. In addition, because the end parts (the circumferential edge parts of the hole 15a) of the bent parts of the plurality of snaps 15, which are brought into pressure contact and engaged with the screw part 11a, serve the role of an internal thread, rotating the coupling member 11 on the side in which the screw part 11a is inserted enables fine adjustment by screwing that screw part 11a in and out, and also enables it to be unscrewed.

According to the structure of the coupling member 11 in the second embodiment described above, the mutual coupling of the coupling members 11 can be performed with a single action by just inserting one of the screw parts 11a into the hole 16a of the set screw 16 of another socket part 11e, and pressing it into the holes 15a of the plurality of snaps 15, allowing for coupling more simply than the coupling members 11 in the first embodiment.

What is claimed is:

1. A rehabilitating pipe for rehabilitating an existing pipe, comprising: segments that are mutually coupled in circumferential and longitudinal directions of the existing pipe to assemble the rehabilitating pipe, and a coupling member provided for each segment for coupling the segments in the longitudinal direction, wherein when an additional segment is coupled in the longitudinal direction to an already longitudinally-coupled segment, a coupling member is inserted through the additional segment and joined to the coupling member of the already longitudinally-coupled segment, and, when they are joined, the coupling member inserted through the additional segment clamps it against the already longitudinally-coupled segment to thereby couple both the segments in the longitudinal direction.

2. A rehabilitating pipe according to claim 1, wherein plural segments are coupled in the circumferential direction of the existing pipe, and the additional segment is coupled in the longitudinal direction to one of the circumferentially coupled segments.

3. A rehabilitating pipe according to claim 1, wherein the coupling members are joined by screwing.

4. A rehabilitating pipe according to claim 1, wherein the coupling members are joined by a snap type joining mechanism.

5. A rehabilitating pipe according to claim 1, wherein the longitudinal length of the coupling member corresponds to the sum of the longitudinal width of the segment plus a prescribed dimension needed for coupling both the segments in the longitudinal direction.

6. A rehabilitating pipe according to claim 1, wherein a plurality of coupling members are used to couple both the segments in the longitudinal direction.

7. A rehabilitating pipe according to claim 1, wherein the fixing member is used as a coupling member for a starting segment to which the additional segment is coupled in the longitudinal direction.

8. A rehabilitating pipe assembled in an existing pipe, the rehabilitating pipe comprising: a first pipe unit comprised of first segments coupled to one another in a circumferential direction of the existing pipe; a second pipe unit comprised of second segments coupled to one another in the circumferential direction; a third pipe unit comprised of third segments coupled to one another in the circumferential direction; the first, second and third pipe units being disposed in side-by-side relationship in a longitudinal direction of the existing pipe; a first coupling member extending in the longitudinal direction through a first segment; a second coupling member extending in the longitudinal direction through a second segment and coupled at one end to an end of the first coupling member to couple together the first and second pipe units in the longitudinal direction; and a third coupling member extending in the longitudinal direction through a third segment and coupled at one end to the other end of the second coupling member to couple together the second and third pipe units in the longitudinal direction.

9. A rehabilitating pipe according to claim 8; further comprising plural sets of first, second and third coupling members.

10. A rehabilitating pipe according to claim 9; wherein the coupling members are coupled by screw threaded connections.

11. A rehabilitating pipe according to claim 9; wherein the coupling members are coupled by snap connections.

12. A rehabilitating pipe according to claim 9; wherein the first, second and third coupling members of each set are axially aligned with one another in the longitudinal direction.

13. A rehabilitating pipe according to claim 8; wherein the coupling members are coupled by screw threaded connections.

14. A rehabilitating pipe according to claim 8; wherein the coupling members are coupled by snap connections.

15. A rehabilitating pipe according to claim 8; wherein the first, second and third coupling members are axially aligned with one another in the longitudinal direction.

16. A rehabilitating pipe according to claim 8; wherein the length of the first, second and third coupling members in the longitudinal direction is greater than the width of the first, second and third segments, respectively, in the longitudinal direction.

17. A rehabilitating pipe according to claim 8; wherein the first, second and third pipe units have a ring-shaped configuration.

18. A rehabilitating pipe according to claim 17; wherein the ring-shaped configuration is circular.

19. A rehabilitating pipe according to claim 8; wherein the first, second and third coupling members are coupled in end-to-end relationship.

* * * * *